US012530046B2

(12) United States Patent
Yuan (10) Patent No.: US 12,530,046 B2
(45) Date of Patent: Jan. 20, 2026

(54) MULTI-PHASE CLOCK CALIBRATION IN A RECEIVER

(71) Applicant: Avago Technologies International Sales Pte. Limited, Singapore (SG)

(72) Inventor: Guangwei Yuan, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 78 days.

(21) Appl. No.: 18/667,840

(22) Filed: May 17, 2024

(65) Prior Publication Data

US 2025/0355460 A1 Nov. 20, 2025

(51) Int. Cl.
*G06F 1/10* (2006.01)
*G06F 1/08* (2006.01)

(52) U.S. Cl.
CPC . *G06F 1/08* (2013.01); *G06F 1/10* (2013.01)

(58) Field of Classification Search
CPC ..................................... G06F 1/10; G06F 1/08
See application file for complete search history.

(56) References Cited

U.S. PATENT DOCUMENTS

| 5,822,247 | A * | 10/1998 | Tassan Caser | G11C 8/08 365/185.28 |
| 6,255,974 | B1 * | 7/2001 | Morizio | H03M 3/484 341/118 |
| 10,001,515 | B1 * | 6/2018 | Wang | G01R 25/005 |
| 2005/0218956 | A1 * | 10/2005 | LaBerge | G06F 1/12 327/291 |
| 2006/0113966 | A1 * | 6/2006 | Chen | H02J 7/007182 320/162 |
| 2007/0216438 | A1 * | 9/2007 | Gupta | G11C 29/56 324/762.02 |
| 2009/0115472 | A1 * | 5/2009 | Pfaff | H03L 7/06 327/156 |
| 2011/0221491 | A1 * | 9/2011 | Shibasaki | H03L 7/091 327/156 |

* cited by examiner

*Primary Examiner* — Phil K Nguyen
(74) *Attorney, Agent, or Firm* — Kim & Stewart LLP (57) ABSTRACT

An example calibration circuit for a receiver includes a first circuit coupled to decision circuits in the receiver. The decision circuits are configured to compare a signal to reference voltages at times based on clocks. The clocks have different phases. The first circuit is configured to receive an output of the decision circuits, generate, in response to the output, the reference voltages, the reference voltages being shifted from centers of data eyes at the decision circuits, and generate a control signal based on comparisons of the reference voltages. The calibration circuit includes a second circuit, coupled to the first circuit and the decision circuits, configured to output the clocks to the decision circuits and apply at least one correction in duty cycle to at least one of the clocks in response to the control signal received from the first circuit.

20 Claims, 8 Drawing Sheets

|  | Delay<br>CLK 0 | Delay<br>CLK 90 | Delay<br>CLK 180 | Delay<br>CLK 270 |
|---|---|---|---|---|
| Ref Voltage Value 1 | Delay Value | ... |  |  |
| Ref Voltage Value 2 | ⋮ |  |  |  |
| Ref Voltage Value 3 |  |  |  |  |
| ⋮ |  |  | ⋮ |  |
| Ref Voltage Value n |  |  |  |  |

|  | Ref Voltage Value | Delay Value |
|---|---|---|
| CLK 0 | RV 0 | DELAY 0 |
| CLK 90 | RV 1 | DELAY 1 |
| CLK 180 | RV 2 | DELAY 2 |
| CLK 270 | RV 3 | DELAY 3 |

MULTI-PHASE CLOCK CALIBRATION IN A RECEIVER

BACKGROUND

A serializer/deserializer (SerDes) is a circuit that can be used in high-speed communications to compensate for the limitations of various mediums for data transmission. A pair of SerDes circuits can convert between serial and parallel interfaces in each direction. A serial interface may send data, referred to as serial data, sequentially over a single channel. A parallel interface may send data, referred to as parallel data, concurrently over multiple channels. Serial data can be transmitted between SerDes circuits over a transmission line. A transmission line may be a structure designed to carry electromagnetic waves. The term applies when the structure is long enough that the wave nature of the transmission must be considered. In example SerDes applications, the transmission line can be electrical, optical, or a combination of electrical and optical.

A SerDes can include both a transmitter and a receiver. The transmitter can serialize data to be transmitted (e.g., convert parallel data to serial data) and couple a signal to the transmission line (referred to as the transmitted signal). The transmitter can encode the serial data in the amplitude of pulses of the transmitted signal (e.g., voltage pulses, current pulses, or light pulses), which is referred to as pulse-amplitude modulation (PAM). The number of pulse discrete amplitudes can be a power of two. For example, in two-level PAM (PAM-2), there are $2^1$ (two) possible discrete pulse amplitudes; in four-level PAM (PAM-4), there are $2^2$ (four) possible discrete pulse amplitudes; and so on. Each pulse amplitude in PAM can map to a symbol and each symbol can convey $\log_2(N)$ bits, where N is the number of discrete pulse amplitudes. For example, in PAM-2, there are two symbols each conveying one bit; in PAM-4 there are four symbols each conveying two bits; and so on. PAM-2 modulation is also referred to as non-return-to-zero (NRZ) modulation. Thus, the transmitted signal may include a series of symbols representing the serial data. The transmitter can operate using a clock the frequency of which dictates the rate of the transmitted symbols (referred to as the symbol rate). The reciprocal of the symbol rate is referred to as the symbol period. In two-level modulation (e.g., PAM-2), since one symbol is one bit, the symbol rate can be referred to as the bit rate and the symbol period can be referred to as the bit period.

The receiver can measure a signal on the transmission line (referred to as the received signal). The receiver makes decisions for the values of the symbols. For example, the receiver can include a decision circuit that compares the amplitude of the received signal against a reference amplitude at times aligned with the symbols. The decision circuit can output comparison results as estimated symbols. The superposition of the received signal transients at the decision circuit onto the symbol period (also known as a unit interval (UI)) may be referred to as an eye diagram. A data eye may be an area of the eye diagram that is not crossed by any received signal transients. The maximum width of the data eye may be referred to as the horizontal eye opening, and the maximum height of the data eye may be referred to as the vertical eye opening. The receiver can sample the signal anywhere inside the data eye to minimize symbol errors. For robustness, the decision circuit can make comparisons at or near the center of the horizontal eye opening. The receiver can generate or derive a clock used by the decision circuit to control the timing of the comparisons. The receiver can adjust the phase of the clock using a delay circuit to perform the comparisons at or near the center of the horizontal eye opening. The receiver can set the reference amplitude of the decision circuit to be at or near the center of the vertical eye opening (e.g., a reference amplitude midway between the peak-to-peak amplitude of the received signal).

A receiver can use a multi-phase clock to overcome limitations in the distribution of a high-speed clock with a frequency at the symbol rate. For example, the receiver can use a multi-phase clock having four clocks, each being one-quarter of the symbol rate. The four clocks can be successively ninety-degrees out-of-phase, e.g., clock phases of 0, 90, 180, and 270 degrees. The receiver can include four decision circuits that use the four clocks to compare the signal at four successive comparison times to estimate four successive symbols. The multi-phase clock, however, should be calibrated before being used by the receiver.

One technique for multi-phase clock calibration is to set the reference amplitude of the decision circuits to the center of the vertical eye opening. The receiver can then determine, using a delay circuit for each clock, a first delay of the clock aligned with the left edge of the data eye and a second delay of the clock aligned with the right edge of the data eye. The receiver can then determine an average of the delays as the center of the horizontal eye opening. This technique, however, is sensitive to the integral non-linearity (INL) of the delay circuits used to delay the clocks across the data eye.

SUMMARY

In an embodiment, a calibration circuit for a receiver is described. The calibration circuit includes a first circuit coupled to decision circuits in the receiver. The decision circuits are configured to compare a signal to reference voltages at times based on clocks. The clocks have different phases. The first circuit is configured to receive an output of the decision circuits, generate, in response to the output, the reference voltages, the reference voltages being shifted from centers of data eyes at the decision circuits, and generate a control signal based on comparisons of the reference voltages. The calibration circuit includes a second circuit, coupled to the first circuit and the decision circuits, configured to output the clocks to the decision circuits and apply at least one correction in duty cycle to at least one of the clocks in response to the control signal received from the first circuit.

In an embodiment, a receiver is described. The receiver includes a front-end coupled to a transmission line to receive a signal. The receiver includes decision circuits coupled to the front-end, where the decision circuits are configured to compare the signal to reference voltages at times based on clocks having different phases. The receiver includes a first circuit, coupled to the decision circuits, configured to receive an output of the decision circuits, generate, in response to the output, the reference voltages, the reference voltages being shifted from centers of data eyes at the decision circuits, and generate a control signal in response to comparisons of the reference voltages. The receiver includes a second circuit coupled to the first circuit and the decision circuits, configured to output the clocks to the decision circuits and apply at least one correction in duty cycle to at least one of the clocks in response to the control signal received from the first circuit.

In an embodiment, a method of calibration in a receiver is described. The method includes receiving a signal, comparing, using decision circuits of the receiver, the signal to reference voltages at times based on clocks having different phases, and receiving an output of the decision circuits. The method further includes generating, in response to the output, the reference voltages, the reference voltages being shifted from centers of data eyes at the decision circuits, generating a control signal in response to comparisons of the reference voltages, and applying at least one correction in duty cycle to at least one of the clocks in response to the control signal.

DETAILED DESCRIPTION

Multi-phase clock calibration in a receiver is described. A multi-phase clock may be a set of clocks having different phases. In some embodiments, a multi-phase clock includes an in-phase clock, a quadrature clock, a logical inverse of the in-phase clock, and a logical inverse of the quadrature clock. The receiver can include a calibration circuit to calibrate the multi-phase clock. As used herein, "calibrate" can mean to adjust within a desired precision to achieve a particular function. The calibration circuit can adjust the multi-phase clock by manipulating one or more of its component clocks, where such manipulations include, for example, adjusting duty-cycle of clock(s), adjusting relative phase between pair(s) of clocks, and delaying clock(s). The precision of the clock adjustments can be determined by the precision of the circuits performing the manipulations (e.g., delay circuits, duty cycle correction circuit, etc.). The function achieved by the calibration circuit may be the recovery of data from a received signal. The calibration circuit can supply the multi-phase clock to decision circuits in the receiver. In embodiments, the decision circuits compare voltage of the received signal against reference voltages at times determined by the clocks of the multi-phase clock. The calibration circuit can adjust the clocks so that each decision circuit makes its comparisons at or near the center of the data eye. For each decision circuit, the calibration circuit can adjust the reference voltage thereof until finding a width of the data eye that is a function of a constant time interval, such as a width equal to or approximately equal to twice the constant time interval. The constant time interval can be less than half the UI. This centering technique, as compared to the centering process described in the background above, improves centering accuracy by converting an integral non-linear error into a quantization error. These and further aspects of multi-phase clock calibration according to embodiments are described below with respect to the drawings.

Figure 1:
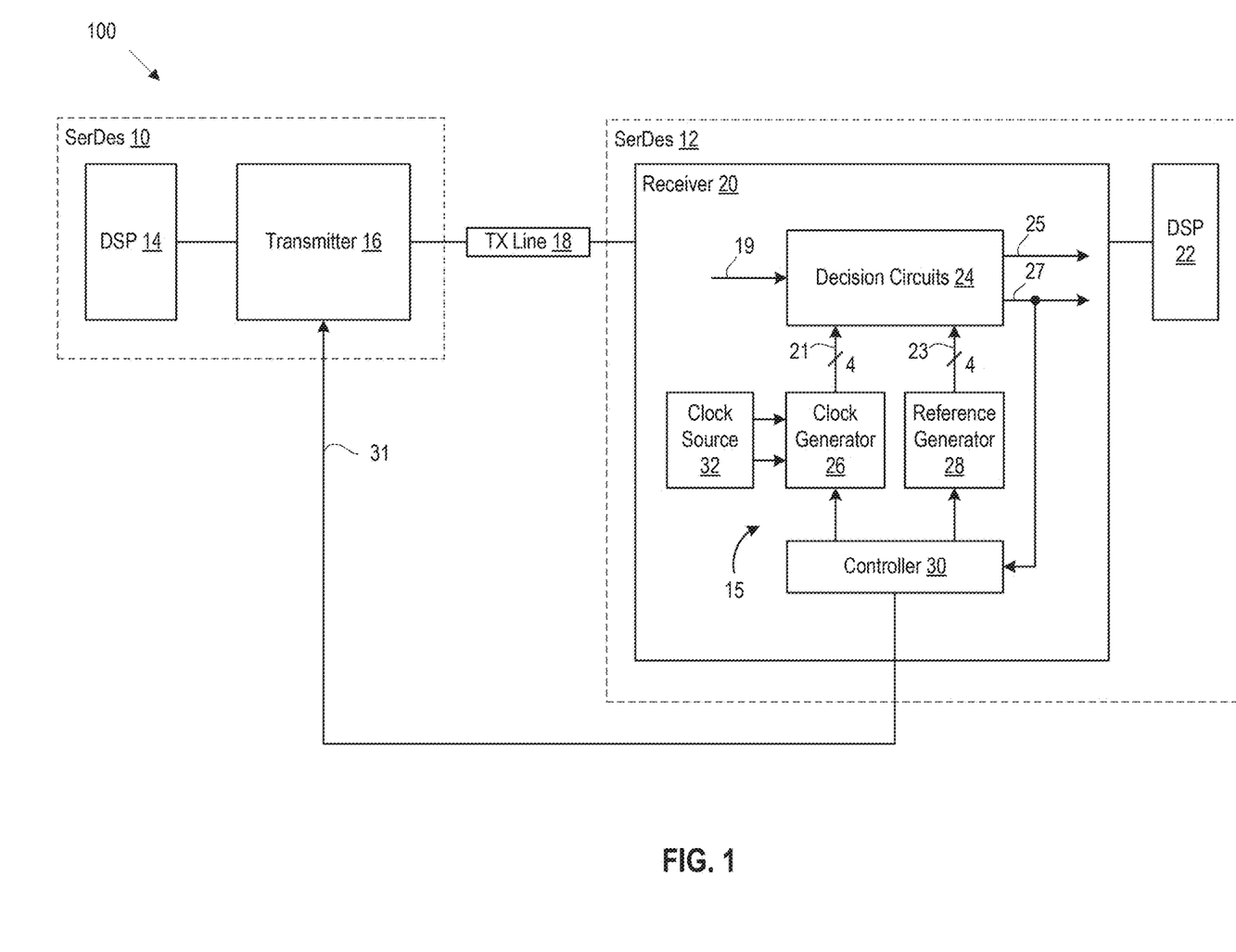
FIG. 1 is a block diagram depicting a communication circuit according to some embodiments.

FIG. 1 is a block diagram depicting a communication circuit 100 according to some embodiments. Communication circuit 100 comprises a SerDes 10 coupled to a SerDes 12 by a transmission line 18. SerDes 10 includes a digital signal processor (DSP) 14 coupled to a transmitter 16. SerDes 12 includes a receiver 20 coupled to a DSP 22. A SerDes may be a circuit having a serializer function that converts parallel data into serial data and a deserializer function that converts serial data into parallel data A DSP may be a circuit that manipulates data that is discrete in time and amplitude (e.g., values represented by binary codes). A transmitter may be a circuit that transmits data in a signal through a transmission medium. A receiver may be a circuit that observes a signal propagating through a transmission medium. SerDes 10 can include circuits for the deserializer function and SerDes 12 can include circuits for the serializer function, each of which are omitted for clarity.

DSP 14 can supply parallel data to transmitter 16, where the parallel data may be multiple streams of binary codes carried by multiple channels of a parallel interface between DSP 14 and transmitter 16. Transmitter 16 can serialize the parallel data into serial data, where the serial data may be a single stream of binary codes carried by a single channel of a serial interface. Transmitter 16 can couple a signal to transmission line 12 that encodes the serial data (referred to as the transmitted signal). In embodiments, transmitter 16 encodes the serial data in the transmitted signal using PAM-2 modulation (also referred to as NRZ modulation). The transmitted signal may be a signal that continuously varies in voltage over time. The transmitted signal conveys a series of symbols, where the symbols represent bits. The bit rate of the transmitted signal can be determined by a clock in transmitter 16 (shown in FIG. 2).

Receiver 20 can measure a signal from transmission line 12 (referred to as the received signal). In embodiments, the received signal comprises a signal that continuously varies in voltage over time Receiver 20 can include decision circuits 24. A decision circuit may be a circuit that compares the voltage of the received signal to a reference voltage at discrete times and outputs discrete results of the comparisons. Receiver 20 can supply the received signal to decision circuits 24 on a signal path 19. Decision circuits 24 can receive clocks on a signal path 21 and reference voltages on a signal path 23. Decision circuits 24 can compare the voltage of the received signal on signal path 19 to reference voltages on signal path 23 at times determined by clocks on signal path 21 and output comparison results. In some embodiments, the comparison results include estimated bit decisions (e.g., estimates of the bits conveyed by the transmitted signal). Decision circuits 24 can output estimated bit decisions on a signal path 25. The comparison results can also include estimated differences between the voltage of the received signal and the reference voltages at the comparison times. Decision circuits 24 can output estimated differences for the comparisons on a signal path 27. Decision circuits 24 can output the estimated differences as binary codes that represent the magnitude of the differences. Receiver 20 can include various other circuits for processing the estimated bit decisions, estimated differences, or both, such as equalizers, clock recovery circuits, and the like (not shown). Receiver 20 generates serial data comprising the estimated bit decisions. Receiver 20 can deserialize the serial data into parallel data, which can be coupled to DSP 22 for further processing.

SerDes 12 includes a clock source 32. A clock source may be a circuit that supplies one or more clock signals. A clock signal (also referred to herein as a clock) may be a logic signal that oscillates between a high logic state and a low logic state ideally at a constant frequency. Clock source 32 can supply two clocks having the same ideal frequency and different phases referred to as an in-phase clock and a quadrature clock. An in-phase clock may be a clock and a quadrature clock may be a clock that has an ideal phase-shift of 90 degrees with respect to the in-phase clock (e.g., the in-phase clock and the quadrature clock are ideally out-of-phase by 90 degrees). A clock in various embodiments herein may be described as having ideal parameters (e.g., ideal frequency, ideal duty cycle, etc.) and ideal relationships with other clock(s) (e.g., ideal phase-shift) Circuit non-idealities in communication circuit 100 may result in the clocks having non-ideal parameters, non-ideal relationships, or both (e.g., clock frequency can differ from the ideal frequency, a phase-shift between clocks can differ from the ideal phase-shift, etc.).

In some embodiments, the frequency of the in-phase and quadrature clocks is ideally set to one-quarter the bit rate of the transmitted signal. In some embodiments, clock source 32 can be a circuit that receives a clock forwarded from SerDes 10 that ideally has a frequency matching one-quarter of the bit rate of the transmitted signal. The forwarded clock can be used as a reference to generate the in-phase and quadrature clocks. In other embodiments, clock source 32 may be a phase-locked loop (PLL) or the like type of known circuit configured to generate the in-phase and quadrature clocks. In such embodiments, clock source 32 can have its frequency set according to a clock recovered from the received signal (e.g., using a clock recovery circuit that derives a clock from the received signal).

SerDes 12 can include a calibration circuit 15 for calibrating clocks in receiver 20. Calibration circuit 15 may be a circuit that calibrates a multi-phase clock used by decision circuits 24. Calibration circuit 15 can receive a multi-phase clock from clock source 32, calibrate the multi-phase clock based on feedback from decision circuits 24, and supply a calibrated multi-phase clock as output for used by decision circuits 24. In embodiments, the multi-phase clock from clock source 32 is a two-phase clock comprising an in-phase clock and a quadrature clock. In other embodiments, the multi-phase clock from clock source 32 is a four-phase clock comprising an in-phase clock, a logical inverse of the in-phase clock, a quadrature clock, and a logical inverse of the quadrature clock. Calibration circuit 15 can supply a calibrated clock as a four-phase clock comprising an in-phase clock, a logical inverse of the in-phase clock, a quadrature clock, and a logical inverse of the quadrature clock. Calibration circuit 15 can include a clock generator 26, a reference generator 28, and a controller 30. A clock generator may be a circuit that manipulates input clocks based on a control signal to generate output clocks. A reference generator may be a circuit that manipulates reference voltages supplied to decision circuits 24 based on a control signal. A controller may be a circuit that generates control signal(s) responsive to input signal(s).

Controller 30 can receive comparison differences on signal path 27 as input. Controller 30 can supply a control signal to clock generator 26 and a control signal to reference generator 28 as output. Controller 30 can also supply a control signal to transmitter 16 on a signal path 31 as output. Clock generator 26 receives clocks from clock source 32, e.g., an in-phase clock and a quadrature clock. Clock generator 26 manipulates clock(s) received from clock source 32 based on the control signal from controller 30. Clock generator 26 manipulates one or more of the input clocks, such as shifting the phase one input clock relative to another input clock, adjusting the duty cycle of one or more input clocks, applying a delay to one or more input clocks, or any combination of such manipulations. In response to the manipulation(s) of the input clocks, clock generator 26 can output a four-phase clock comprising an in-phase clock (referred to as CLK 0), a quadrature clock (referred to as CLK 90), the logical inverse of the in-phase clock (referred to as CLK 180), and the logical inverse of the quadrature clock (referred to as CLK 270). The logical inverse of the in-phase clock may be a clock that has an ideal 180-degree phase-shift with respect to the in-phase clock. The logical inverse of the quadrature clock may be a clock that has an ideal 180-degree phase-shift with respect to the quadrature clock and hence an ideal 270-degree phase-shift with respect to the in-phase clock.

Reference generator 28 can supply the reference voltages for decision circuits 24 on signal path 23. Reference generator 28 can supply one reference voltage for each phase of the four-phase clock supplied on signal path 21 (e.g., four reference voltages). Responsive to the control signal from controller 30, reference generator 28 can vary the magnitude of the reference voltages. Operation of controller 30 to control clock generator 26 and reference generator 28 during clock calibration is discussed below.

Figure 2:
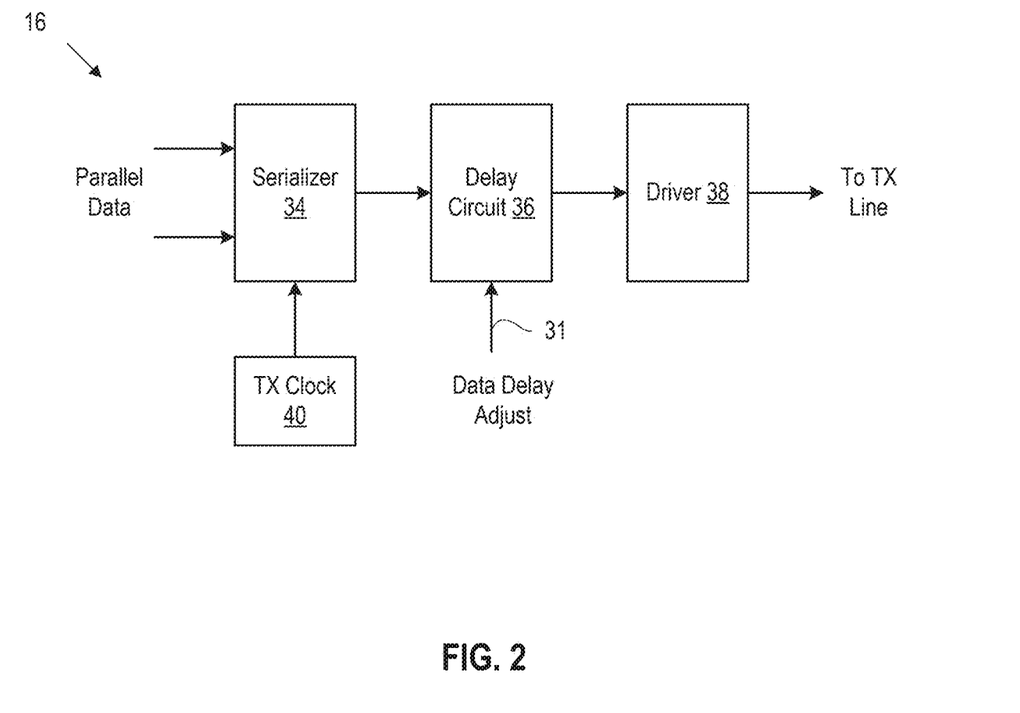
FIG. 2 is a block diagram depicting a transmitter according to some embodiments.

FIG. 2 is a block diagram depicting transmitter 16 according to some embodiments. Transmitter 16 includes a serializer 34, a delay circuit 36, a driver 38, and a transmitter clock (TX clock 40). A serializer may be a circuit that converts parallel data to serial data. Serializer 34 implements the serializer function of SerDes 10. Serializer 34 can generate serial data as output based on a clock supplied by TX clock 40. The frequency of TX clock 40 controls the bit rate of transmitted signal. Serializer 34 supplies the serial data to delay circuit 36. A delay circuit may be a circuit that delays a signal in time. An input signal of the delay circuit can be the signal at the input and an output signal of the delay circuit can be the input signal or a delayed version of the input signal. Unless otherwise indicated, the amount of delay of a delay circuit can be variable and selectable based on a control signal (e.g., selectable from a discrete number of delay amounts). Delay circuit 36 can delay a signal carrying the serial data by an amount determined by the control signal on signal path 31 (which can be some delay or no delay). A driver may be a circuit that couples a signal onto a transmission line in response to input. Driver 38 receives an input signal supplied by the output of data delay circuit 36. Driver 38 couples a signal onto transmission line 18 that encodes the serial data, as discussed above.

Figure 3:
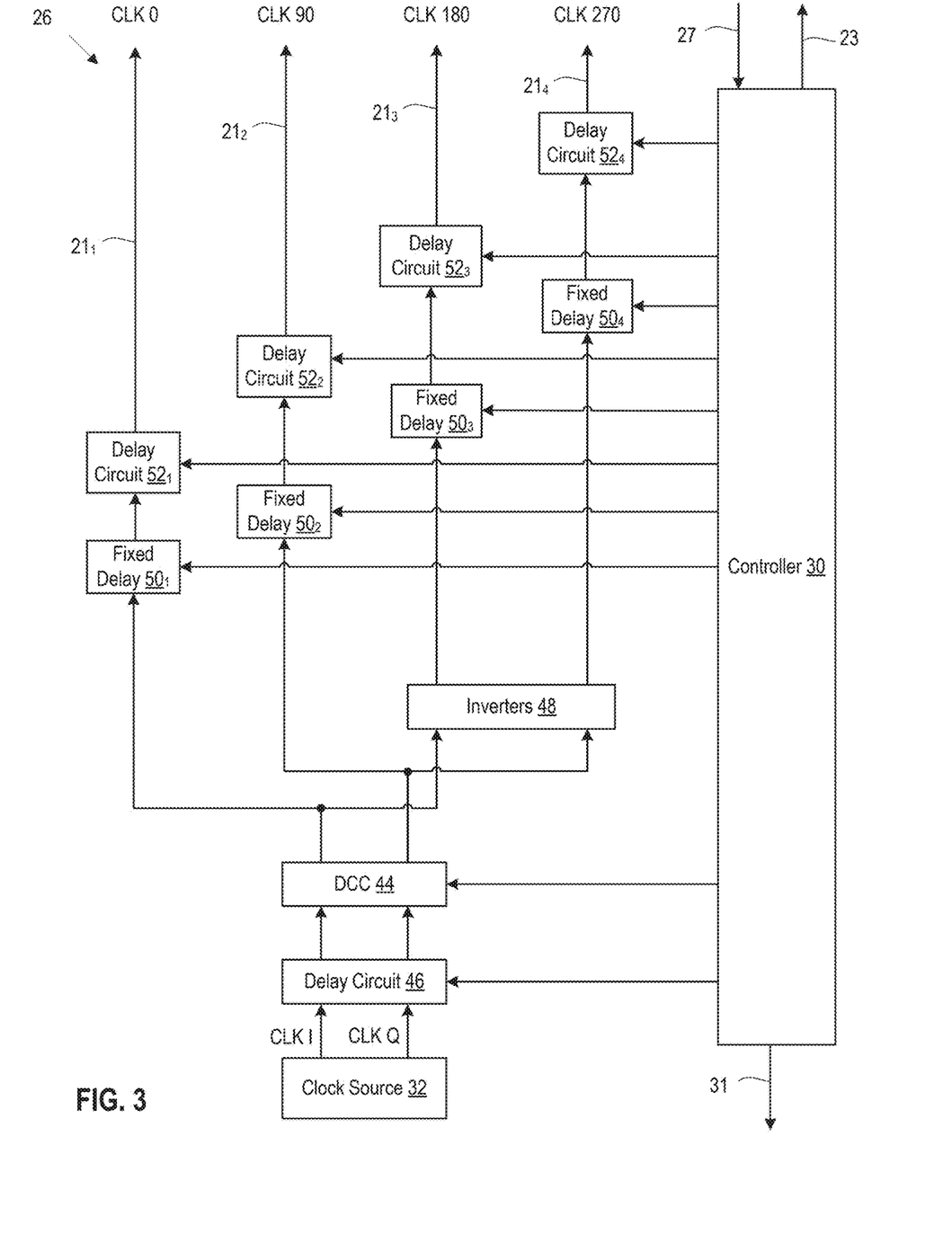
FIG. 3 is a block diagram depicting a clock generator according to some embodiments.

FIG. 3 is a block diagram depicting clock generator 26 according to some embodiments. Clock generator 26 is shown in FIG. 3 along with clock source 32 and controller 30 for context. Clock generator 26 can include a delay circuit 46, a duty cycle correction (DCC) circuit 44, inverters 48, fixed delay circuits $50_1 \ldots 50_4$ (collectively fixed delay circuits 50), and delay circuits $52_1 \ldots 52_4$ (collectively delay circuits 52). In-phase and quadrature clocks from clock source 32 can be coupled to inputs of delay circuit 46. Delay circuit 46 may delay one or both of the in-phase and quadrature clocks based on a control signal from controller 30. Outputs of delay circuit 46 can supply in-phase and quadrature clocks to inputs of the DCC circuit 44. A DCC circuit may be a circuit that adjusts a duty cycle of one or more clocks. An input clock of the DCC circuit may be a clock and an output clock of the DCC circuit may be the input clock with an adjusted duty cycle or the input clock without an adjusted duty cycle. DCC 44 can adjust the duty cycle of the in-phase clock, the quadrature clock, both in-phase and quadrature clocks, or neither the in-phase clock nor the quadrature clock, based on a control signal from controller 30. Outputs of DCC 44 can supply in-phase and quadrature clocks to inputs of fixed delay circuit $50_1$ and fixed delay circuit $50_2$, respectively. The outputs of DCC 44 can supply in-phase and quadrature clocks to inputs of inverters 48. An inverter may be a circuit that inverts a logic signal. An input signal may be a logical signal at the input of the inverter and an output signal may be an inverted version of the input signal. Inverters 48 invert the in-phase and quadrature clocks to generate an inverted in-phase clock and an inverted-quadrature clock, respectively. The inverted in-phase clock is supplied to an input of fixed delay circuit $50_3$. The inverted quadrature clock is supplied to an input of fixed delay circuit $50_4$. In other embodiments, clock source 32 can supply a four-phase clock signal, in which case delay circuit 46 and DCC circuit 44 can manipulate the four-phase clock signal and inverters 48 can be omitted.

A fixed delay circuit may be a circuit that delays a signal by a fixed amount of time (applies a fixed delay also referred to as a constant delay). An input signal of the fixed delay circuit can be a signal at the input and an output signal of the fixed delay circuit can be either the input signal or a version of the input signal delayed by a fixed delay. Fixed delay circuit $50_1$ can receive an in-phase clock (CLK 0) as input and apply a fixed delay or no delay based on a control signal from controller 30. Fixed delay circuit $50_1$ can supply an in-phase clock (CLK 0) as output. Fixed delay circuit $50_2$ can receive a quadrature clock (CLK 90) as input and apply a fixed delay or no delay based on a control signal from controller 30. Fixed delay circuit $50_2$ can supply quadrature clock (CLK 90) as output. Fixed delay circuit $50_3$ can receive an inverted in-phase clock (CLK 180) as input and apply a fixed delay or no delay based on a control signal from controller 30. Fixed delay circuit $50_3$ can supply an inverted in-phase clock (CLK 180) as output Fixed delay circuit $50_4$ can receive an inverted quadrature clock (CLK 270) as input and apply a fixed delay or no delay based on a control signal from controller 30. Fixed delay circuit $50_4$ can supply an inverted quadrature clock (CLK 270) as output.

Delay circuit $52_1$ can receive the in-phase clock (CLK 0) as input and apply a variable delay or no delay based on a control signal from controller 30. Variable delay circuit $52_1$ can supply an in-phase clock (CLK 0) as output on a signal path $21_1$. Variable delay circuit $52_2$ can receive the quadrature clock (CLK 90) as input and apply a variable delay or no delay based on a control signal from controller 30. Variable delay circuit $52_2$ can supply quadrature clock (CLK 90) as output on a signal path $21_2$. Variable delay circuit $52_3$ can receive the inverted in-phase clock (CLK 180) as input and apply a variable delay or no delay based on a control signal from controller 30. Variable delay circuit $52_3$ can supply an inverted in-phase clock (CLK 180) as output on a signal path $21_3$ Variable delay circuit $52_4$ can receive the inverted quadrature clock (CLK 270) as input and apply a variable delay or no delay based on a control signal from controller 30. Variable delay circuit $52_4$ can supply an inverted quadrature clock (CLK 270) as output on a signal path $21_4$.

Figure 4:
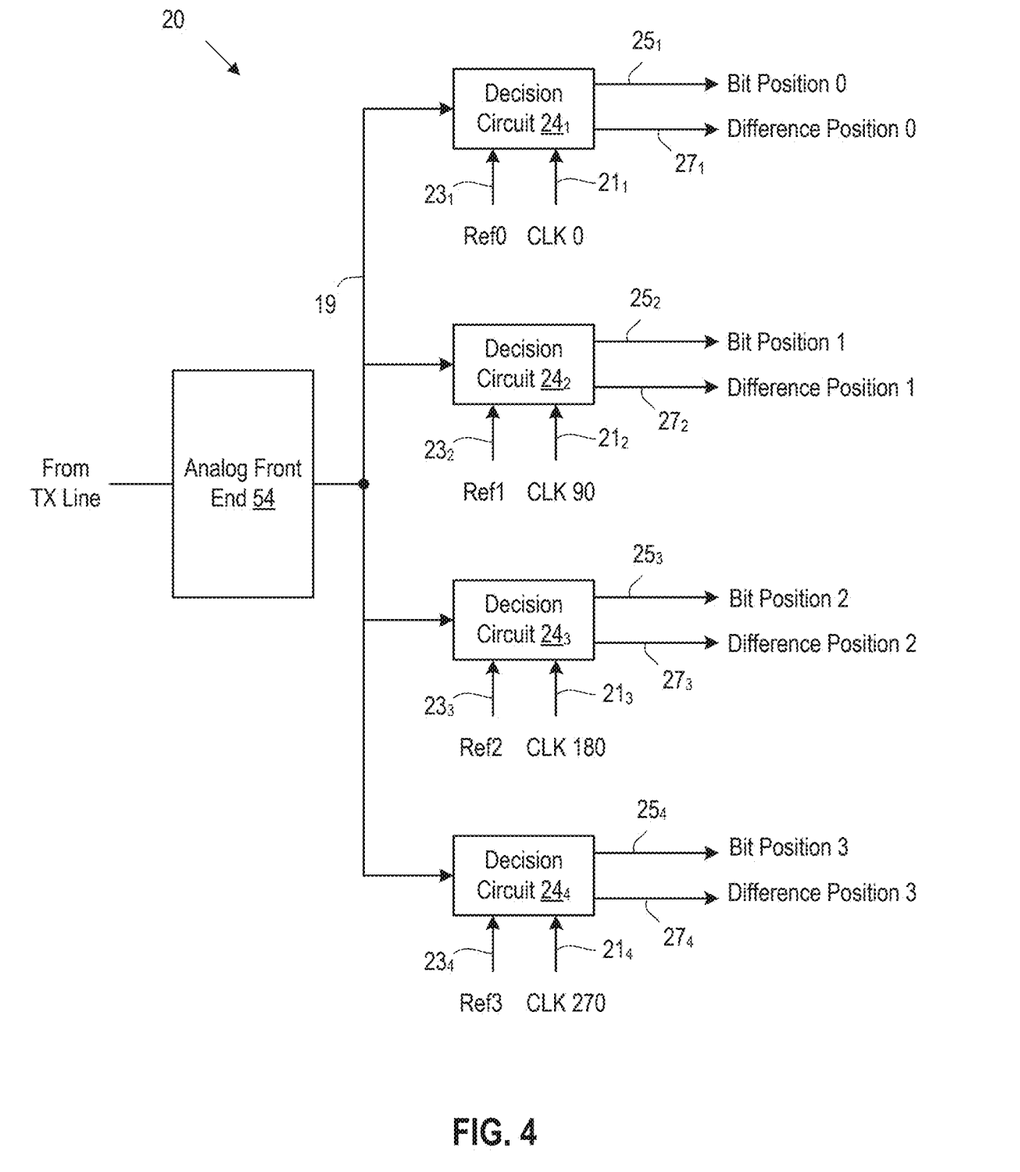
FIG. 4 is a block diagram depicting a receiver according to some embodiments.

FIG. 4 is a block diagram depicting receiver 20 according to some embodiments. Receiver 20 can include an analog front-end 54 and decision circuits $24_1$ ... $24_4$. An analog front-end may be a circuit that measures a signal from a transmission medium that varies continuously in amplitude over time (e.g., an analog signal). Analog front-end 54 can include various circuits, such a termination impedance, coupling capacitors, a bias circuit, an amplifier, equalizer, and the like, or any combination thereof. Analog front-end 54 supplies the received signal on signal path 19 as input to decision circuits 24. A decision circuit $24_1$ can receive a reference voltage (Ref 0) via a signal path $23_1$ and the in-phase clock (CLK 0) via signal path $21_1$. Decision circuit $24_1$ can receive the received signal as input and output an estimated bit in a first bit position (bit position 0) on a signal path $25_1$ and an estimated difference for the first bit position (difference position 0) on a signal path $27_1$. A decision circuit $24_2$ can receive a reference voltage (Ref 1) via a signal path $23_2$ and the quadrature clock (CLK 90) via signal path $21_2$. Decision circuit $24_2$ can receive the received signal as input and output an estimated bit in a second bit position (bit position 1) on a signal path $25_2$ and an estimated difference for the second bit position (difference position 1) on a signal path $27_2$. A decision circuit $24_3$ can receive a reference voltage (Ref 2) via a signal path $23_2$ and the inverted in-phase clock (CLK 180) via signal path $21_3$. Decision circuit $24_3$ can receive the received signal as input and output an estimated bit in a third bit position (bit position 2) on a signal path $25_3$ and an estimated difference for the third bit position (difference position 2) on a signal path $27_3$. A decision circuit $24_4$ can receive a reference voltage (Ref 3) via a signal path $23_3$ and the inverted quadrature clock (CLK 270) via signal path $21_4$. Decision circuit $24_4$ can receive the received signal as input and output an estimated bit in a fourth bit position (bit position 3) on a signal path $25_4$ and an estimated difference for the fourth bit position (difference position 3) on a signal path $27_4$. Receiver 20 can multiplex bit positions 0-3 repeatedly into serial data having the bit rate of the transmitted signal.

Figure 5:
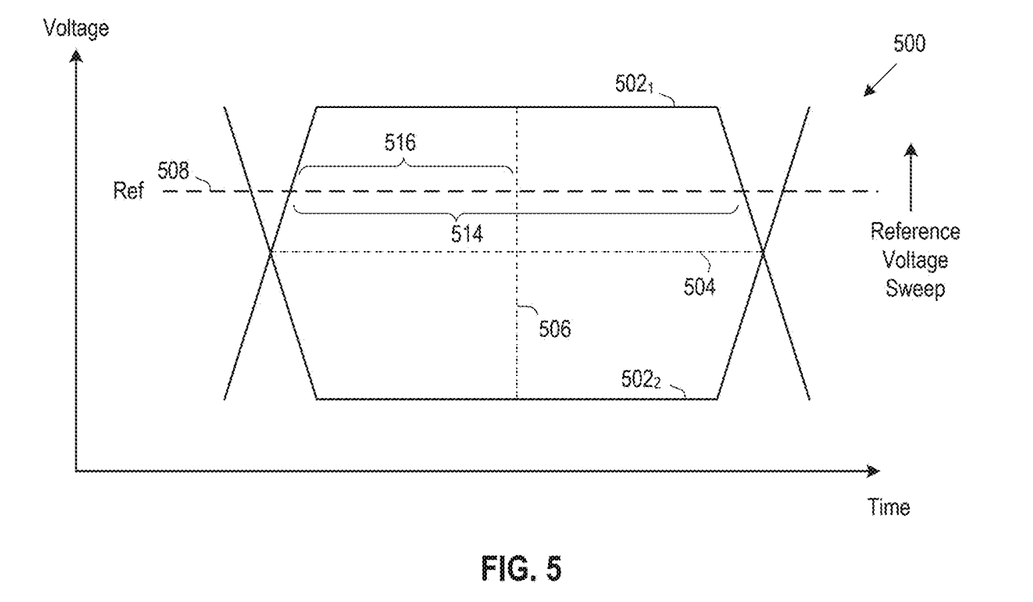
FIG. 5 is a graph depicting an eye diagram according to some embodiments.

FIG. 5 is a graph 500 depicting an eye diagram according to some embodiments Graph 500 includes a horizontal axis representing time and a vertical axis representing voltage. A data eye at the input of a decision circuit can be the superposition of signal transients onto a bit period equivalent to the UI. Graph 500 shows a data eye bounded by signal transients $502_1$ and $502_2$ of the received signal. The data eye includes a vertical eye opening 506 and a horizontal eye opening 504. A center of the data eye may refer to the center of horizontal eye opening 504, the center of vertical eye opening 506, or an intersection of horizontal eye opening 504 and vertical eye opening 506, depending on context. For example, in the context of adjusting a clock, the center of the data eye can be the center of horizontal eye opening 504. In the context of adjusting the reference voltage, the center of the data eye can be the center of vertical eye opening 506.

Figure 6:
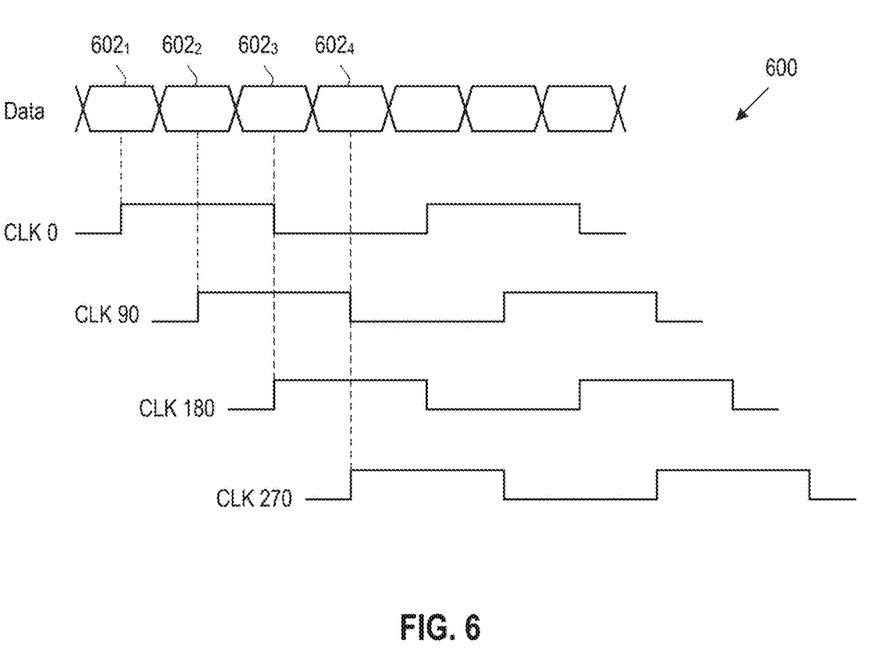
FIG. 6 is a signal diagram depicting data and clocks according to some embodiments.

FIG. 6 is a signal diagram 600 depicting data and clocks according to some embodiments. Signal diagram 600 shows bit positions $602_1$, $602_2$, $602_3$, and $602_4$ of the received signal in receiver 20 (referred to as "data") For robustness in estimating the bits, calibration circuit 15 can manipulate the in-phase clock (CLK 0) to cause decision circuit $24_1$ to perform its comparison at or near the center of bit position $602_1$. Calibration circuit 15 can manipulate the quadrature clock (CLK 90) to cause decision circuit $24_2$ to perform its comparison at or near the center of bit position $602_2$. Calibration circuit 15 can manipulate the inverse in-phase clock (CLK 180) to cause decision circuit $24_3$ to perform its comparison at or near the center of bit position $602_3$. Calibration circuit 15 can manipulate the inverse quadrature clock (CLK 270) to cause decision circuit $24_4$ to perform its comparison at or near the center of bit position $602_4$.

Figure 7:
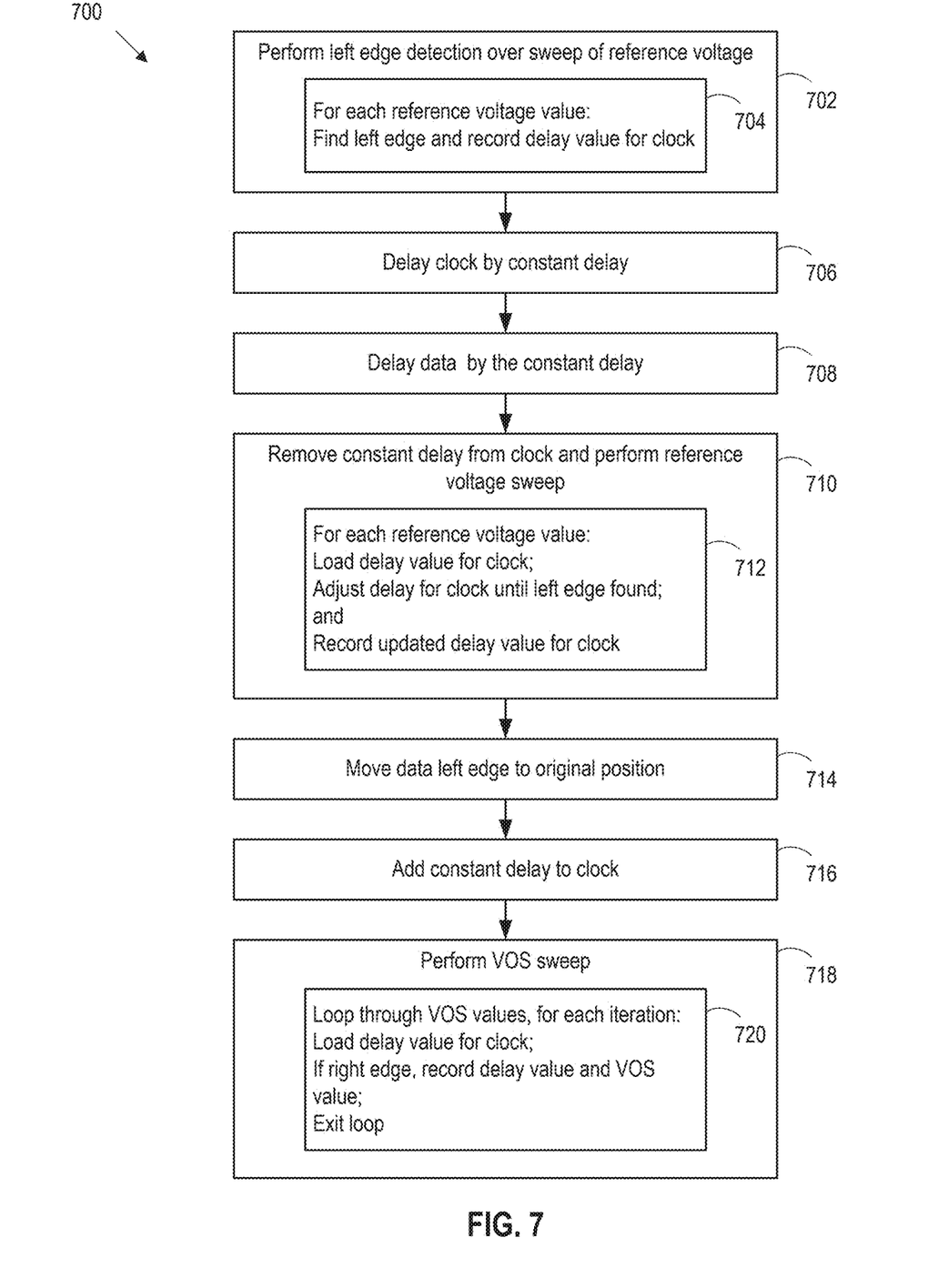
FIG. 7 is a flow diagram depicting a method of aligning a clock to a bit period of a signal at a decision circuit according to embodiments.

FIG. 7 is a flow diagram depicting a method 700 of aligning a clock to a bit period of a signal at a decision circuit according to embodiments. Method 700 can be used in a clock calibration method described below with respect to FIG. 9. For purposes of clarity by example, method 700 is described with respect to aligning the in-phase clock to the first bit period. However, method 700 can be performed for each clock of the multi-phase clock supplied to decision circuits 24 for each of the four bit periods concurrently.

Method 700 begins at step 702, where controller 30 can perform a left edge detection over a sweep of the reference voltage supplied to decision circuit $24_1$ (Ref 0). Controller 30 can control reference generator 28 to iterate through a range of reference voltages, such as from an initial voltage at the center of the data eye towards the top or bottom of the data eye (e.g., from the center of the data eye and increasing as shown in FIG. 5). At step 704, for each reference voltage in the sweep, controller 30 can control clock generator 26 to adjust the delay of the clock supplied to the decision circuit and observe the comparison differences output from the decision circuits. In the example, controller 30 can control clock generator 26 to adjust the delay of the in-phase clock (CLK 0) supplied to decision circuit $24_1$ and observe the comparison differences on signal path $27_1$ (difference position 0). Controller 30 can adjust the delay of the in-phase clock by controlling the delay applied by delay circuit 511. In step 702, fixed delay circuit $50_1$ is not applying a fixed delay to the in-phase clock. In step 704, for each reference voltage in the sweep, controller 30 can record the delay value applied by delay circuit 51; that results in detection of the left edge of the data eye. Controller 30 can determine detection of the left edge by observing a minimum of the comparison differences.

At step 706, controller 30 can delay the clock by a constant delay (e.g., the in-phase clock in this example). In embodiments, the constant delay is equivalent to a constant time interval that is less than half the UI (e.g., less than half the bit period). This is shown in FIG. 5 as time interval 516, which is less than half of horizontal eye opening 504. In the example, controller 30 can control fixed delay circuit $50_1$ to apply a fixed delay to the in-phase clock (CLK 0), where the fixed delay is equal to the constant delay. At step 708, controller 30 can delay the data by the constant delay. Controller 30 can control delay circuit 36 in transmitter 16 via signal path 31 to apply the constant delay (e.g., the same fixed delay applied by fixed delay circuit $50_1$). At this point, controller 30 is again detecting the left edge of the data eye.

At step 710, controller 30 can remove the constant delay from the clock and perform another sweep of the reference voltage. For example, controller 30 can control fixed delay circuit $50_1$ to not apply the fixed delay and then can control reference generator 28 to iterate through the range of reference voltages. At step 712, for each reference voltage in the sweep, controller 30 can: (1) load the delay value recorded in step 704 (e.g., sets delay circuit $52_1$ with the delay value determined in step 704); (2) adjust the delay of the clock until the left edge of the data eye is detected (e.g., by controlling delay circuit $52_1$ and observing the comparison differences from decision circuit $24_1$); and (3) record the updated delay value for the clock (e.g., records the delay value applied by delay circuit $52_1$).

At step 714, controller 30 can remove the constant delay from the data. Controller 30 can control delay circuit 36 in transmitter 16 via signal path 31 to remove the constant delay. At step 716, controller 30 can delay the clock by the constant delay (e.g., the in-phase clock in this example). In the example, controller 30 can control fixed delay circuit $50_1$ to apply a fixed delay to the in-phase clock (CLK 0).

At step 718, controller 30 can perform another sweep of the reference voltage. For example, controller 30 can control reference generator 28 to iterate through the range of reference voltages. At step 720, for each reference voltage in the sweep, controller 30 can. (1) load the delay value recorded in step 712 (e.g., set delay circuit $52_1$ with the delay value determined in step 712); and (2) determine if the right edge is detected (e.g., by observing the comparison differences from decision circuit $24_1$). If the right edge is detected in an iteration of the reference voltage sweep, controller 30 can record the current delay value (e.g., the current delay value applied by delay circuit $52_1$) and the reference voltage value (e.g., the current reference voltage supplied to decision circuit $24_1$). The delay value recorded at step 720 aligns the clock at or near the center of the data eye. The reference voltage value recorded at step 720 is shifted from the center of the data eye at the decision circuit. As shown in FIG. 5, at a reference voltage 508 recorded at step 720, a width 514 of the data eye is at or near twice the constant delay represented by time interval 516. The delay value recorded at step 720 is thus determined through adjustment of the reference voltage, which improves centering accuracy and is subject to quantization error of the reference voltage rather than INL of the delay circuit.

Figure 8A:
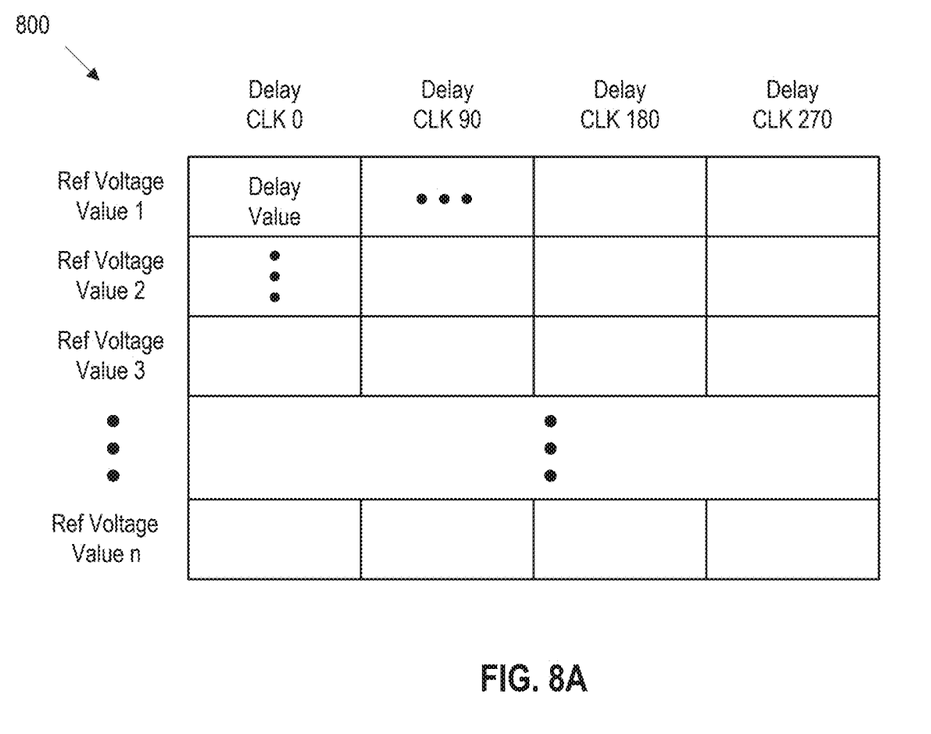
FIG. 8A is a block diagram depicting data recorded by a controller according to embodiments.

FIG. 8A is a block diagram depicting data 800 recorded by controller 30 according to embodiments. Controller 30 can include a memory circuit for recording data 800. Data 800 can include delay values recorded for each of the clocks of the multi-phase clock (e.g., Delay CLK 0, Delay CLK 90, Delay CLK 180, and Delay CLK 270). For each of the clocks, delay values are recorded for each of the reference voltage values in the reference voltage sweep. Controller 30 can generate data 800 in step 704 for each clock and update data 800 in step 712 for each clock.

Figure 8B:
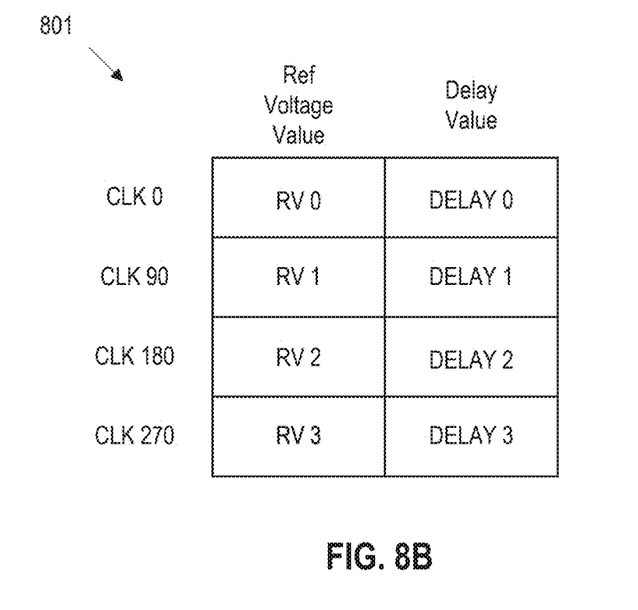
FIG. 8B is a block diagram depicting data recorded by a controller according to embodiments.

FIG. 8B is a block diagram depicting data 801 recorded by controller 30 according to embodiments Controller 30 can include a memory circuit for recording data 801. Data 801 can include a pair of delay value and reference voltage value for each of the clocks. Controller 30 can record data 801 at step 720 for each of the clocks. The delay values in data 801 can be those that align the clocks with the centers of the data eyes (e.g., delay 0 for bit period 0; delay 1 for bit period 1; delay 2 for bit period 2, and delay 3 for bit period 3). The reference voltage values recorded in data 801 can be used in the clock calibration method described in FIG. 9 below (e.g., RV0, RV1, RV2, and RV3 for Ref 0, Ref 1, Ref 2, and Ref 3, respectively).

Figure 9:
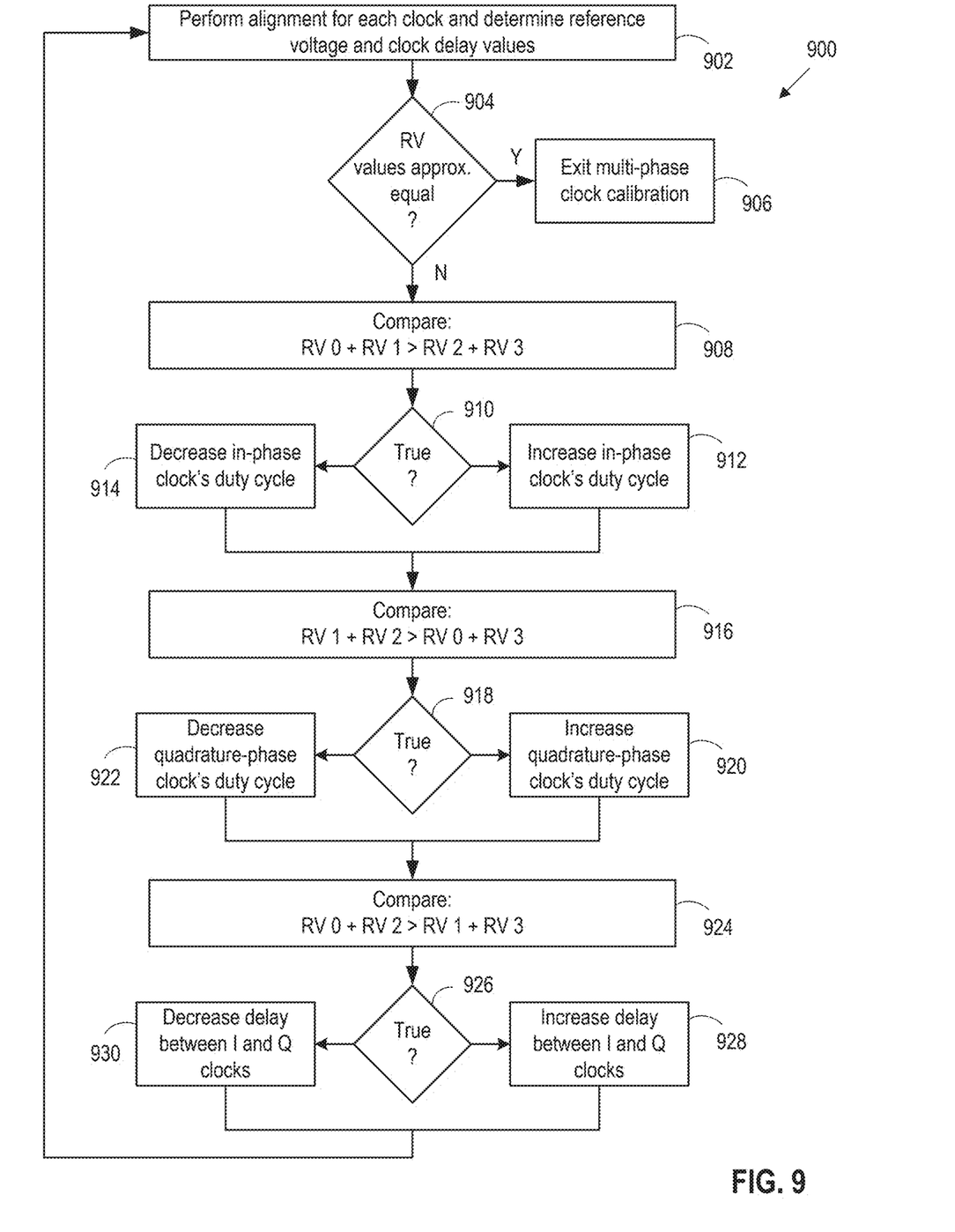
FIG. 9 is a flow diagram depicting a method of calibrating a multi-phase clock according to embodiments.

FIG. 9 is a flow diagram depicting a method 900 of calibrating a multi-phase clock according to embodiments. In embodiments, the multi-phase clock is the four-phase clock discussed above supplied to decision circuits 24 in receiver 20. Method 900 can be performed by controller 30 of calibration circuit 15. Method 900 begins at step 902, where controller 30 can center each of the clocks in their respective data eyes using method 700 for each clock. This results in controller 30 recording data 801 shown in FIG. 8B, in particular, the reference voltage values RV 0, RV 1, RV 2, and RV 3. At step 904, controller 30 can determine whether the reference voltage values RV 0, RV 1, RV 2, and RV 3 are equal or approximately equal. If so, method 900 proceeds to step 906, where controller 30 can exit multi-phase clock calibration. Otherwise, method 900 proceeds from step 904 to step 908.

At step 908, controller 30 can make a comparison of the reference voltage values determined in step 902, where the comparison can be RV 0+RV 1>RV 2+RV 3. At step 910, if the comparison at step 908 is true, this indicates that the duty cycle of the in-phase clock (CLK 0) and the inverse of the in-phase clock (CLK 180) is less than 50%. Thus, if the comparison at step 908 is true, method 900 proceeds to step 912, where controller 30 can increase the duty cycle of the in-phase clock (e.g., by controlling DCC 44) If at step 908 the comparison is false, method 900 proceeds to step 914, where controller 30 can decrease the duty cycle of the in-phase clock (e.g., by controlling DCC 44). Method 900 proceeds from step 912 or 914 to step 916.

At step 916, controller 30 can make another comparison of the reference voltage values determined in step 902, where the comparison can be RV 1+RV 2>RV 0+RV 3. At step 918, if the comparison at step 916 is true, this indicates that the duty cycle of the quadrature clock (CLK 90) and the inverse of the in-phase clock (CLK 270) is less than 50%. Thus, if the comparison at step 918 is true, method 900 proceeds to step 920, where controller 30 can increase the duty cycle of the quadrature clock (e.g., by controlling DCC 44). If at step 918 the comparison is false, method 900 proceeds to step 922, where controller 30 can decrease the duty cycle of the quadrature clock (e.g., by controlling DCC 44). Method 900 proceeds from step 920 or 922 to step 924.

At step 924, controller 30 can make another comparison of the reference voltage values determined in step 902, where the comparison can be RV 0+RV 2>RV 1+RV 3. At step 926, if the comparison at step 924 is true, this indicates that duty cycle of an exclusive-OR of the in-phase clock and the quadrature clock is less than 50%. Thus, if the comparison at step 926 is true, method 900 proceeds to step 928, where controller 30 can increase the delay between the in-phase clock and the quadrature clock (e.g., by controlling delay circuit 46). If at step 926 the comparison is false, method 900 proceeds to step 930, where controller 30 can decrease the delay between the in-phase clock and the quadrature clock (e.g., by controlling delay circuit 46) Method 900 proceeds from either step 930 or step 928 back to step 902.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A calibration circuit for a receiver, comprising:
 a first circuit coupled to decision circuits in the receiver, the decision circuits configured to compare a signal to reference voltages at times based on clocks, the clocks having different phases, the first circuit configured to:
  receive an output of the decision circuits;
  generate, in response to the output, the reference voltages, the reference voltages being shifted from centers of data eyes at the decision circuits; and
  generate a control signal based on comparisons of the reference voltages; and
 a second circuit, coupled to the first circuit and the decision circuits, configured to output the clocks to the decision circuits and apply at least one correction in duty cycle to at least one of the clocks in response to the control signal received from the first circuit.

2. The calibration circuit of claim 1, wherein the first circuit is configured to set the reference voltages such that widths of the data eyes at the reference voltages are each a constant time interval that is less than a unit interval (UI) of the signal.

3. The calibration circuit of claim 1, wherein the clocks include a first clock a second clock, a third clock, and a fourth clock having a first phase, a second phase, a third phase, and a fourth phase, respectively, and wherein the reference voltages include a first offset, a second offset, a third offset, and a fourth offset, the decision circuits are configured to compare the signal to the first offset, the second offset, the third offset, and the fourth offset at times based on the first clock, the second clock, the third clock, and the fourth clock, respectively.

4. The calibration circuit of claim 3, wherein the comparisons include: a first comparison of a sum of the first offset and the second offset against a sum of the third offset and the fourth offset; and a second comparison of a sum of the second offset and the third offset against a sum of the first offset and the fourth offset.

5. The calibration circuit of claim 4, wherein the second circuit is configured to apply a first correction in duty cycle to the first clock based on the first comparison and a second correction in duty cycle to the second clock based on the second comparison.

6. The calibration circuit of claim 3, wherein the comparisons include a first comparison of a sum of the first offset and the third offset against a sum of the second offset and the fourth offset, and wherein the second circuit is configured to adjust a delay between the first clock and the second clock based on the first comparison.

7. The calibration circuit of claim 3, wherein the first clock is an in-phase clock, the second clock is a quadrature clock, the third clock is a logical inverse of the in-phase clock, and the third clock is a logical inverse of the quadrature clock.

8. The calibration circuit of claim 1, wherein the second circuit is configured to apply delays to the clocks, and wherein the first circuit is configured to set the reference voltages by adjusting the delays.

9. The calibration circuit of claim 8, wherein the first circuit is configured to set the delays such that the times at which the decision circuits compare the signal to the reference voltages occur within the data eyes.

10. The calibration circuit of claim 8, wherein the second circuit is configured to control a transmitter to apply a delay to the signal, and wherein the first circuit is further configured to set the reference voltages by adjusting the delay of the signal at the transmitter.

11. A receiver, comprising:
a front-end coupled to a transmission line to receive a signal;
decision circuits coupled to the front-end, the decision circuits configured to compare the signal to reference voltages at times based on clocks having different phases;
a first circuit, coupled to the decision circuits, configured to:
  receive an output of the decision circuits;
  generate, in response to the output, the reference voltages, the reference voltages being shifted from centers of data eyes at the decision circuits; and
  generate a control signal in response to comparisons of the reference voltages; and
a second circuit, coupled to the first circuit and the decision circuits, configured to output the clocks to the decision circuits and apply at least one correction in duty cycle to at least one of the clocks in response to the control signal received from the first circuit.

12. The receiver of claim 11, wherein the clocks comprise an in-phase clock, a quadrature clock, a logical inverse of the in-phase clock, and a logical inverse of the quadrature clock.

13. The receiver of claim 12, wherein the reference voltages include a first offset, a second offset, a third offset, and a fourth offset, and wherein the decision circuits are configured to compare the signal to the first offset, the second offset, the third offset, and the fourth offset at times based on the in-phase clock, the quadrature clock, the logical inverse of the in-phase clock, and the logical inverse of the quadrature clock, respectively.

14. The receiver of claim 13, wherein the comparisons include: a first comparison of a sum of the first offset and the second offset against a sum of the third offset and the fourth offset; and a second comparison of a sum of the second offset and the third offset against a sum of the first offset and the fourth offset.

15. The receiver of claim 14, wherein the second circuit is configured to apply a first correction in duty cycle to the in-phase clock based on the first comparison and a second correction in duty cycle to the quadrature clock based on the second comparison.

16. A method of calibration in a receiver, comprising:
receiving a signal;
comparing, using decision circuits of the receiver, the signal to reference voltages at times based on clocks having different phases;
receiving an output of the decision circuits;
generating, in response to the output, the reference voltages, the reference voltages being shifted from centers of data eyes at the decision circuits;
generating a control signal in response to comparisons of the reference voltages; and
applying at least one correction in duty cycle to at least one of the clocks in response to the control signal.

17. The method of claim 16, wherein the clocks comprise an in-phase clock, a quadrature clock, a logical inverse of the in-phase clock, and a logical inverse of the quadrature clock.

18. The method of claim 17, wherein the reference voltages include a first offset, a second offset, a third offset, and a fourth offset, and wherein the decision circuits are configured to compare the signal to the first offset, the second offset, the third offset, and the fourth offset at times based on the in-phase clock, the quadrature clock, the logical inverse of the in-phase clock, and the logical inverse of the quadrature clock, respectively.

19. The method of claim 18, wherein the step of generating the control signal comprises:
comparing, in a first comparison, a sum of the first offset and the second offset against a sum of the third offset and the fourth offset; and
comparing, in a second comparison, a second comparison of a sum of the second offset and the third offset against a sum of the first offset and the fourth offset.

20. The method of claim 19, wherein the step of applying the at least one correction in duty cycle comprises:
applying a first correction in duty cycle to the in-phase clock based on the first comparison; and
applying a second correction in duty cycle to the quadrature clock based on the second comparison.

* * * * *